(12) United States Patent
Kalthoff et al.

(10) Patent No.: US 7,133,878 B2
(45) Date of Patent: Nov. 7, 2006

(54) EXTERNAL EVALUATION PROCESSES

(75) Inventors: Wolfgang Kalthoff, Bad Schonborn (DE); Thomas Vogt, Römerberg (DE); Guenter Huber, Oberkirch (DE); Guido Hoeckele, Knittlingen (DE)

(73) Assignee: SAP Aktiengesellschaft, Walldorf (DE)

( * ) Notice: Subject to any disclaimer, the term of this patent is extended or adjusted under 35 U.S.C. 154(b) by 421 days.

(21) Appl. No.: 10/328,716

(22) Filed: Dec. 23, 2002

(65) Prior Publication Data

US 2003/0182298 A1 Sep. 25, 2003

Related U.S. Application Data

(60) Provisional application No. 60/367,397, filed on Mar. 21, 2002.

(51) Int. Cl.
G06F 17/00 (2006.01)

(52) U.S. Cl. .................... 707/102; 707/101; 707/104.1

(58) Field of Classification Search ................ 707/102, 707/104.1; 701/211; 705/10, 1, 21; 395/210
See application file for complete search history.

(56) References Cited

U.S. PATENT DOCUMENTS

| | | | |
|---|---|---|---|
| 4,459,663 A | | 7/1984 | Dye |
| 5,099,431 A | | 3/1992 | Natarajan |
| 5,191,534 A | | 3/1993 | Orr et al. |
| 5,311,424 A | | 5/1994 | Mukherjee et al. |
| 5,442,782 A | | 8/1995 | Malatesta et al. |
| 5,655,085 A | * | 8/1997 | Ryan et al. ..................... 705/4 |
| 5,694,598 A | | 12/1997 | Durand et al. |
| 5,703,938 A | * | 12/1997 | Lucas et al. ............ 379/112.05 |
| 5,710,884 A | * | 1/1998 | Dedrick ....................... 709/217 |
| 5,859,972 A | | 1/1999 | Subramaniam et al. |
| 5,911,139 A | | 6/1999 | Jain et al. |
| 6,018,742 A | | 1/2000 | Herbert, III |
| 6,032,147 A | | 2/2000 | Williams et al. |
| 6,067,525 A | * | 5/2000 | Johnson et al. ................ 705/10 |
| 6,226,650 B1 | | 5/2001 | Mahajan et al. |
| 6,236,997 B1 | | 5/2001 | Bodamer et al. |

(Continued)

FOREIGN PATENT DOCUMENTS

CA 2391829 6/2001

(Continued)

OTHER PUBLICATIONS

Hong, B. et al., "Modeling of Version Relationships for CAD Databases", Computers and Communications Technology Toward 2000, Seoul, Aug. 25-28, 1987, Proceedings of the Region 10 Conference, (TENCON), New York, IEEE, US, vol. 1, Conf. 3, Aug. 25 1987, pp. 142-146, XP000011783.

(Continued)

*Primary Examiner*—Sana Al-Hashemi
(74) *Attorney, Agent, or Firm*—Fish & Richardson P.C.

(57) ABSTRACT

Methods and apparatus, including computer program products, for managing data. The technique includes defining a secondary data set in a primary data set, linking the secondary data set to state information of the primary data set, transmitting the secondary data set to an external entity, receiving a modified secondary data set from the external entity and linking the modified secondary data set to a version of the primary data set stored with reference to state the information. The state information defines the state of the primary data set at the time the secondary data set is defined. The link between the modified secondary data set and the primary data set allows access by a user of a modified primary data set if the primary data set has changed with reference to the state information.

30 Claims, 7 Drawing Sheets

U.S. PATENT DOCUMENTS

| | | | |
|---|---|---|---|
| 6,324,647 | B1 | 11/2001 | Bowman-Amuah |
| 6,405,132 | B1 * | 6/2002 | Breed et al. ............... 701/301 |
| 6,480,755 | B1 | 11/2002 | Ootani et al. |
| 6,567,818 | B1 | 5/2003 | Frey et al. |
| 6,711,456 | B1 | 3/2004 | Yokomori et al. |
| 6,738,682 | B1 | 5/2004 | Pasadyn |
| 6,754,666 | B1 | 6/2004 | Brookler et al. |
| 6,768,944 | B1 * | 7/2004 | Breed et al. ............... 701/301 |
| 6,857,123 | B1 | 2/2005 | Nuxoll et al. |
| 6,895,408 | B1 | 5/2005 | Kavantzas |
| 2002/0087510 | A1 | 7/2002 | Weinberg et al. |
| 2002/0095454 | A1 | 7/2002 | Reed et al. |
| 2002/0116417 | A1 | 8/2002 | Weinberg et al. |
| 2002/0156688 | A1 | 10/2002 | Horn et al. |
| 2002/0161778 | A1 | 10/2002 | Linstedt |
| 2002/0184308 | A1 | 12/2002 | Levy et al. |
| 2002/0194196 | A1 | 12/2002 | Weinberg et al. |
| 2003/0191832 | A1 | 10/2003 | Satyavolu et al. |
| 2003/0233347 | A1 | 12/2003 | Weinberg et al. |
| 2004/0015408 | A1 | 1/2004 | Rauen, IV et al. |
| 2005/0038551 | A1 | 2/2005 | Mazumder et al. |

FOREIGN PATENT DOCUMENTS

| | | |
|---|---|---|
| DE | 10049940 A1 | 4/2002 |
| WO | WO 01/37097 | 5/2001 |
| WO | WO 02/25471 | 3/2002 |
| WO | WO 02/25500 | 3/2002 |
| WO | WO 02/47463 | 6/2002 |
| WO | 03/093998 | 11/2003 |

OTHER PUBLICATIONS

Rana, S.P. et al., "Version Support for Manufacturing Database Systems", International Conference on Industrial & Engineering Applications of Artificial Intelligence & Expert Systems, Tullahoma, IN, US, New York, NY, US, vol. 2, Jun. 6, 1989, pp. 779-784, XP000605772.

Kamita, T. et al., "A Database Architecture and Version Control for Group Work", System Sciences, 1994, vol. III: Information Systems: Decision Support and Knowledge-Based Systems, Proceedings of the Twenty-Seventh Hawaii International Conference on Wailea, HI, US, Jan. 4-7, 1994, Los Alamitos, CA, US, IEEE Comput. Soc., Jan. 4, 1994, pp. 438-447, XP010097053, ISBN: 0-8186-5070-2.

Chou, H-T. et al., "Versions and Change Notification in an Object-Oriented Database System", Proceedings of the Design Automation Conference, Anaheim, Jun. 12-15, 1988, Proceedings of the Design Automation Conference (DAC), New York, IEEE, US, vol. Conf. 25, Jun. 12, 1988, pp. 275-281, XP010013006, ISBN: 0-8186-0864-1.

International Search Report, International Application No. PCT/IB03/02025, Dec. 19, 2003, pp. 1-2.

Chaudhuri, Surajit, et al., "An Overview of Data Warehousing and OLAP Technology," SIGMOD Record, New York, NY, USA, vol. 26, No. 1, Mar. 1997, pp. 65-74, XP002193792, ISSN: 0163-5808.

Rahm, Erhard, et al., "Data Cleaning: Problems and Current Approaches," IEEE Bulletin of the Technical Committee on Data Engineering, vol. 23, No. 4, retrieved from the Internet Dec. 2000 at http://lips.informatik.uni-leipzig.de:80/pub/2000-45, XP002284896, 11 pgs.

"SyncML Protocol, version 1.0," Internet Citation, Dec. 7, 2000, XP002217356, 60 pgs.

Anonymous "Data Profiling the Foundation for Data Management" *DataFlux Corporation*, Jul. 1, 2004, pp. 1-17.

Garcia et al. "Immunization Registries DeDuplication and Record Matching," *White Paper*, 1999, pp. 1-11.

Georgakopoulos et al. "An Overview of Workflow Management: From Process Modeling to Workflow Automation Infrastructure," *Distributed and Parallel Databases*, 1995, vol. 3, No. 2, pp. 119-153.

Rahm et al. "Data Cleaning: Problems and Current Approaches," *Quarterly Bulletin of the Computer Society of the IEEE Technical Committee on Data Engineering*, Dec. 2000, pp. 1-11.

Haerder T. et al., "Integritaetskontrolle," Datenbanken Konzepte und Techniken Der Implementierung, 1999, pp. 397-405, XP002294581 [translation provided].

U.S. Appl. No. 09/577,268, filed May 2000, Hazi et al.

U.S. Appl. No. 09/643,207, filed Aug. 2000, Brookler et al.

U.S. Appl. No. 09/643,316, filed Aug. 2000, Brookler et al.

Haerder T. et al., "RX-Sperrverfahren," Datenbanken Konzepte und Techniken Der Implementierung, 1999, pp. 419-420, XP002294552 [translation provided].

Bertino, Elisa, et al., "Data Security," Proceedings of the Twenty-Second Annual International Computer Software and Applications Conference, Vienna, Austria, Aug. 19-21, 1998, Los Alamitos, CA, USA, Aug. 19, 1998, (CompSAC '98), XP010305455, pp. 228-237.

Bon, M., et al., "Sharing Product Data Among Heterogeneous Workflow Environments," CAD 2002: Corporate Engineering Research, Geman Informatics Society, Mar. 4-5, 2002, Dresden, Germany, XP002268575, pp. 1-10.

Chandramouli, Ramaswamy, "Application of XML Tools for Enterprise-Wide RBAC Implementation Tasks," Proceedings of the 5th ACM Workshop on Role-Based Access Control, Berlin, Germany, Jul. 26-27, 2000, XP000958089, pp. 11-18.

Choi, Jin Oh, et al., "Update Propagation of Replicated Data in Distributed Spatial Databases," Proceedings of Database and Expert Systems Applications: Tenth International Conference, Florence, Italy, Aug. 30, 1999-Sep. 2, 1999, DEXA '99 (Lecture Notes in Computer Science vol. 1677), Berlin, Germany, Springer-Verlag, Germany, XP009022583, pp. 952-963.

Ferreira Rezende, Fernando de, et al., "A Lock Method for KBMSs Using Abstraction Relationships' Semantics," Proceedings of the International Conference on Information and Knowledge Management, CIKM, ACM, New York, NY, USA, 1994, XP002943684, pp. 112-121.

Berndtsson et al., "Task Sharing Among Agents Using Reactive Rules," Proceedings of the Second IFCIS International, 56-65 (1997).

Hill et al., "Data Transformation: Key to Information Sharing," Gartner Group—Strategic Analysis Report, R-06-1747:1-60 (1998).

Chan and Suwanda, "Designing Multinational Online Stores: Challenges, Implementation Techniques and Experience", *IBM Centre for Advanced Studies Conference: Proceedings of the 2000 conference of the Centre for Advanced Studies on Collaborative research*, Mississauga, Ontario, Canada, 2000, pp. 1-14.

Sheth and Larson, "Federated Database Systems for Managing Distributed, Heterogeneous, and Antonomous Databases", *ACM Computing Surveys*, 1990, 22(3): 184-236.

* cited by examiner

EXTERNAL EVALUATION PROCESSES

CROSS-REFERENCE TO RELATED APPLICATIONS

This application claims priority based on Provisional U.S. Patent Application No. 60/367,397 for MASTER DATA MANAGEMENT, filed Mar. 21, 2002, the disclosure of which is incorporated here by reference in its entirety.

BACKGROUND

The present invention relates to data processing, and more particularly, to managing data received from external processes.

An important factor in the success of businesses in the current era is the ability to flexibly react to the requirements of the market. Shorter product cycles require decreased product development times and quicker introduction to market while increased customer demands for individual solutions increases the number of variants.

These factors require businesses to be able to proceed simultaneously with the definition of the product requirements and its structure, while participating in collaborative processes with external entities such as subcontractors and development partners. New products must be introduced rapidly to market based on internally and externally defined requirements. In order to do this, different approaches must be considered, and input can be provided by external entities performing external evaluation processes.

External processes can include, for example, verification processes, costing evaluations and crash tests (for automobile production systems).

SUMMARY OF THE INVENTION

The present invention provides methods and apparatus, including computer program products, for managing data.

In general, in one aspect, the invention features methods and apparatus implementing a technique for managing data. The technique includes defining a secondary data set in a primary data set, linking the secondary data set to state information of the primary data set, transmitting the secondary data set to an external entity, receiving a modified secondary data set from the external entity and linking the modified secondary data set to a version of the primary data set stored with reference to state the information. The state information defines the state of the primary data set at the time the secondary data set is defined. The link between the modified secondary data set and the primary data set allows access by a user of a modified primary data set if the primary data set has changed with reference to the state information.

Particular implementations can include one or more of the following features. Linking the secondary data set to the state information can include associating the secondary data set with the primary data set at a time t1. Linking the modified secondary data set to the version of the primary data set stored with reference to the state information can include linking the modified secondary data set to the version of the primary data set existing at a time t1.

The version of the primary data set stored with reference to the state information can be linked to the modified primary data set. Linking the version of the primary data set stored with reference to the state information to the modified primary data set can include linking the version of the primary data set stored with reference to the state information to a version of the primary data set at a time t2, where the version of the primary data set at time t2 represents the current state of the primary data set.

The extended data can be received and linked to the modified secondary data set., the extended data including data added to the secondary data set for processes performed at the external entity. The secondary data set to the external entity can be transmitted to a verification entity, a cost calculating entity, an evaluation entity or a crash test entity. Processes can be performed on the secondary data set at the external entity to obtain the modified set. The processes performed on the secondary data set can include performing evaluations using the secondary data set. A user can be provided with a user interface to access the modified secondary data set.

The technique can also include determining if the modified secondary data set is relevant to the modified primary data set, and linking the modified secondary data set to the modified primary data set if the modified secondary data set is relevant to the modified primary data set. The determination if the modified secondary data set is relevant to the modified primary data set can include receiving input from a user indicating that the modified secondary data set is relevant to the modified primary data set.

In general, in one aspect, the invention features an external data management system. The system can include a data storage system and a product record user interface, where the data storage system stores a historic version of a product record and a current version of the product record. The historic version of a product record can include a link to external data, where the external data is received from an external entity and includes results of evaluations performed on a product structure based on the historic version of the product record. The current version of the product record can include a link to the historic version of the product record. The product record user interface presents a user with a current version of the product record including a user interface control. The user interface control represents the link to the historic version of the product record, and allows the user to access the historic version of the product record, including the external data, through the product record user interface.

Particular implementations can include one or more of the following features. The external data can include extended data used by the external entity to perform the evaluations on the product structure. The data storage system can be part of a central module including long-term storage of data related to the product creation process.

The invention can be implemented to realize one or more of the following advantages. A central data storage stores all objects related to a product creation process, and transmits data, such as product structure, to other entities to perform evaluations. If the product structure has changed when the results of the evaluations are returned, the evaluation results can be stored with the corresponding historic product structure, i.e., the product structure existing at the time the product structure data was sent to the evaluating entity. A user can navigate between the current product structure and the results of evaluations performed on the historic product structure through an evaluation results tool including navigational links between the current product structure and the evaluation results at the corresponding historic product structure. The navigational links can also include links to additional data used in the evaluation process. The access to the results of the evaluations performed on the historic product structure, and the additional data used to perform the evaluations, allows a user to determine if the evaluations are relevant to the current product structure. The evaluation results tool provides users, such as designers, quick access to relevant evaluation results.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
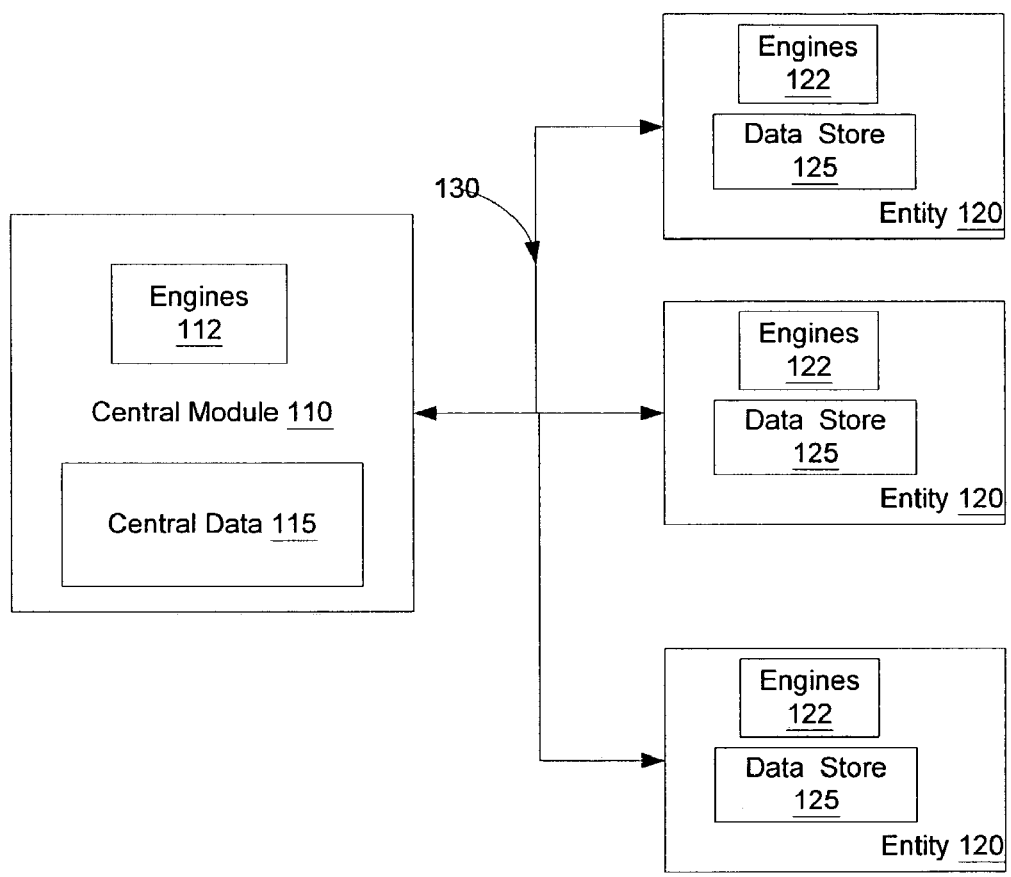
FIG. 1 is a block diagram illustrating an implementation of a product creation system.

As shown in FIG. 1, an external data management system can be implemented in a product creation system. The product creation system includes a central module 110 and entity modules 120. Each of modules 110, 120 includes a data store 115, 125, and engines 112, 122. Engines 112, 122 can represent one or more engines for performing processes in modules 110, 120.

The central module 110 represents a centralized control for a product creation process. The entity modules 120 represent entities involved in the product creation process. Typically, many entities can participate in the development of a product.

The entities can include internal and external entities. For example, entity modules 120 can include modules for testing, cost management, verification, and digital mockup. These entity modules 120 can forward data to the central module 110 which other services use for their processes. The central module 110 and the entity modules 120 can communicate through a network 130.

The central module 110 includes a central data store 115 that stores master data for a product creation process. The central data can be accessed by the entity modules 120 or transmitted to the entity modules 120 through network 130. Each of the entity modules 120 includes a data store 125 for storing the data received from the central module 110 and for additional entity specific data developed in a given entity module 120. For example, if the entity module 120 is a verification module, the corresponding data store 125 can store additional data used to complete a verification process. The entity specific data can be transmitted to the central data store 115.

Data for the product creation process can be stored in records in the data stores 115, 125. The data includes objects associated with the product creation process. These objects can include product classes, attributes, product line designs, parts lists, materials lists, quality characteristics, and requirements. The objects can be organized in the data store with relation to products, product lines, and classes of products, as described below with reference to FIG. 2 and FIG. 3.

The entity modules 120 can perform evaluations related to the product creation process in parallel or asynchronously through engines 122. Each developing entity module 120 can develop different versions of each object of the product creation process. Each evaluating entity module 120 can perform evaluations based on different versions of products or product lines stored in the central module 110.

The central module 110 and the entity modules 120 can include one or more computer systems, computer applications and/or individual or groups of users. The processes performed at the central module 110 and the entity modules 120 can be performed in engines 112 by computer applications and/or users. Each entity module 120 can include modules to perform evaluations such as cost calculations, crash tests, verifications and other evaluations related to a product creation process.

Figure 2:
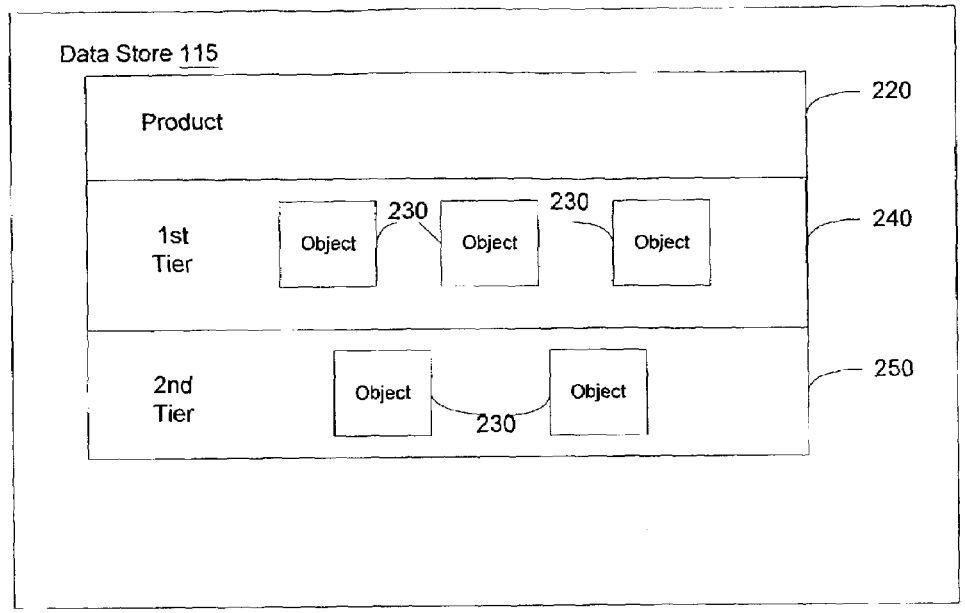
FIG. 2 is a block diagram illustrating an implementation of a data store in an entity of a product creation system.

FIG. 2 is a block diagram illustrating an example of a product record 220 stored in a data store 115, 125. The product associated with the product record 220 can include a specific product or a product line. The product record 220 can include object records 230, such as, for example, one or more class records. Classes can include, in the example of an automobile creation process, types, models, body styles, and sizes. Class records can contain information about classes or sub-classes of the product(s). Thus, each object record 230 in a first tier 240 can have one or more object records 230 in a second tier 250 associated with it.

Object records 230 can be organized in a variety of ways. In one implementation, the object records 230 can be organized in a tree structure with broader objects including narrower objects (or sub-objects) in its branches. For example, a first tier 240 of automobile classes can include types of automobiles, such as economy car, luxury car or sports car. Then, a second tier of automobile classes 250 can include models that are available under that type definition.

In a more general case, the product record 220 can include other types of objects and relationships between these objects. For example, object records 230 can include information about materials, structures, and/or goals.

Figure 3:
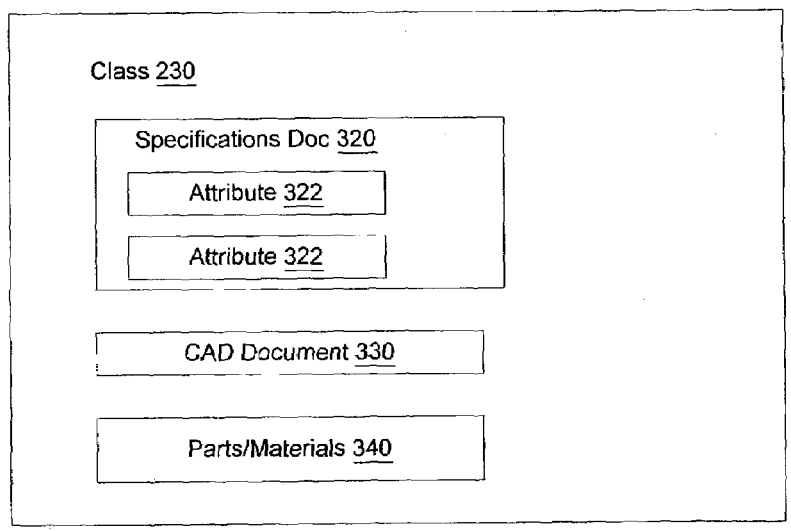
FIG. 3 is a block diagram illustrating a class record within a product record of the product creation system.

FIG. 3 is a block diagram illustrating a class record 230 within the product record (FIG. 2). Object record 230 can include a variety of documents, such as a specification document 320, a computer-aided design ("CAD") Document 330 and a Parts/Materials document 340.

The specification document 320 can include attribute records 322. Each attribute record 322 can contain information about an attribute associated with the product. Attributes can include component information such as engine type (e.g., 95 HP, 110 HP, 125 HP, etc.) or brake type (e.g., disc or drum), or characteristics such as body color (e.g., black, silver, red, etc.) or fuel efficiency (e.g., 25 m.p.g.). Each attribute record 322 can include a value for each attribute. For example, if the attribute record 322 stores information for the attribute "engine power," the information stored in the attribute record can include a value of "110 HP."

Figure 4:
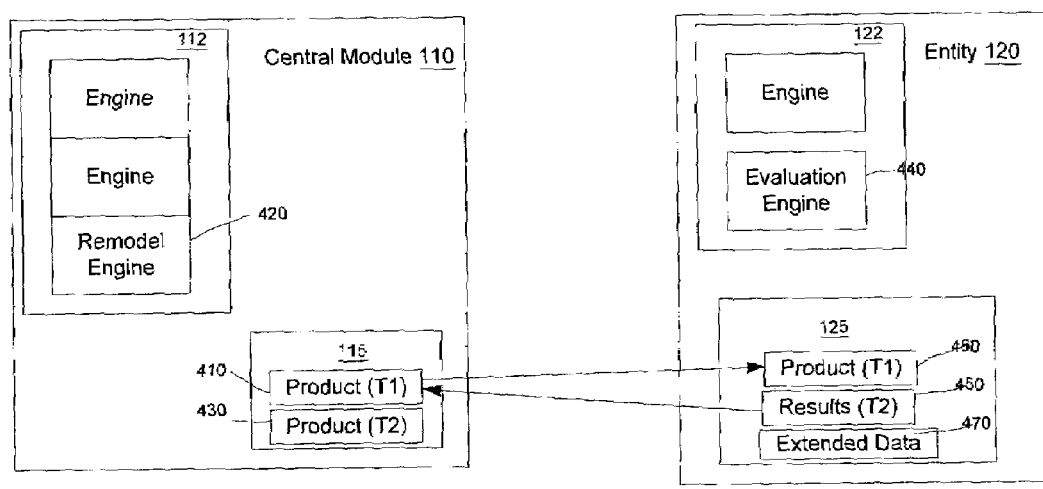
FIG. 4 is a block diagram illustrating an implementation of an external data management system in a product creation system.

FIG. 4 is a block diagram illustrating an implementation of an external data management system in a product creation system. Central module 110 includes product structures (T1) and (T2), stored in locations 410, 430 of data store 115. Central module 110 also includes a remodel engine 420.

Product structure (T1), stored in location 410, includes a product structure at time T1. The product structure can include all objects stored for a product. The remodel engine 420 integrates information received from other modules and/or changes to the product structure (T1).

The product structure (T2), stored in location 430, includes the product structure at time T2. The product structure (T2) includes a product structure defined in the remodel engine 420, incorporating the information or changes to the product structure (T1). The time T2 represents the time when central module 110 receives evaluation results data from entity module 120.

The entity module 120 includes a product structure (T1) stored in location 460, an evaluation engine 440, and results (T2), stored in location 450. Entity module 120 receives the product structure information into location 460 at time T1. The evaluation engine 440 performs evaluations based on the product structure (T1). The results of the evaluation, results (T2), are stored in location 450, and sent to the central module 110 at a time T2.

For example, the entity module 120 can include a module that performs car crash tests. The entity module 120 receives product structure (T1) at location 460, performs the car crash tests through evaluation engine 440, and stores the results (T2) in location 450. The entity module can locally extend the available data, i.e., product structure (T1), by including extended data 470. Extended data 470 can be used by entity module 120 to add context to the product structure (T1) in performing the evaluations in evaluation engine 440. In the car crash test example, the extended data can include a full fuel tank. The entity module 120 then transmits the results to central module 110. The extended data 470 is only relevant for the correct product structure, i.e., the product structure existing at T1 which is used to perform the evaluations. The extended data 470 is linked to product structure (T1), but does not become part of product structure (T1).

The central module 110 stores the received results, results (T2) with the product structure (T1) in location 410. The product structure (T2) stored in location 430 can include a link to the product structure (T1). The link to product structure (T1) in product structure (T2) can be labeled a historic product structure in a user interface. Thus, a virtual link is defined between the product structure (T2) and the results (T2) by adding the results (T2) to the product structure (T1). A user can access the results through a link to the product structure (T1) in a user interface.

Figure 5:
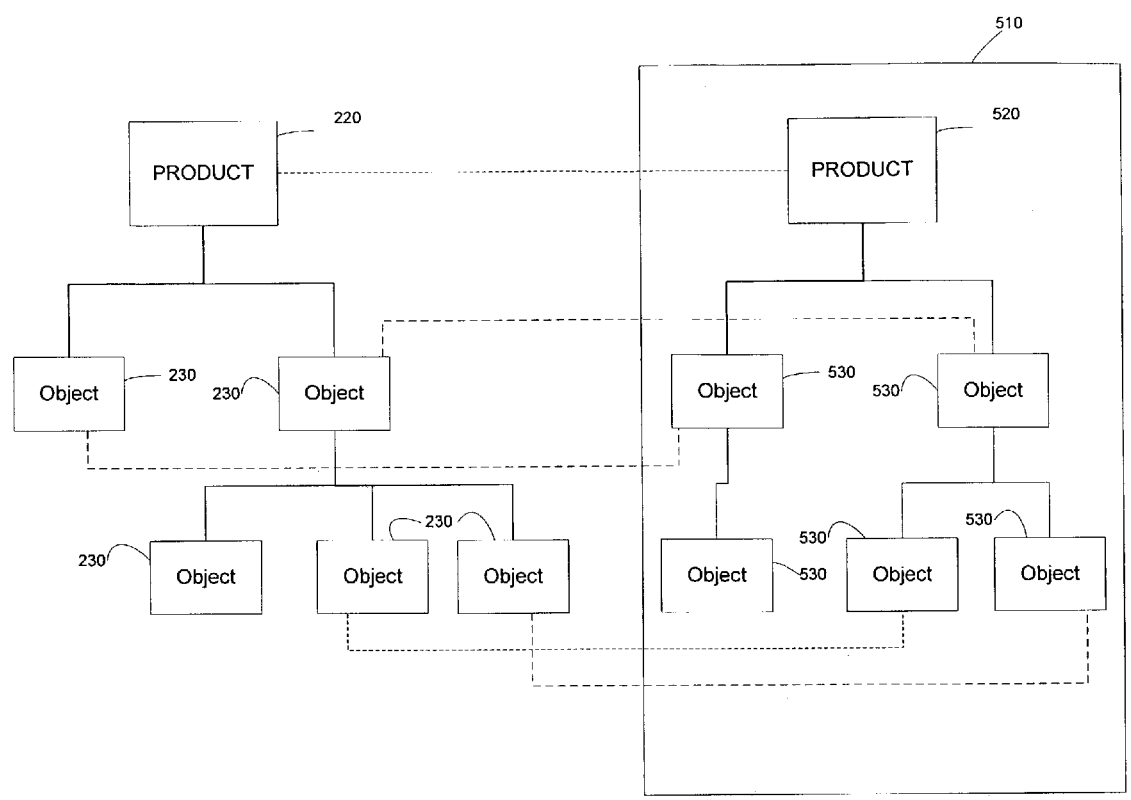
FIG. 5 is a block diagram illustrating an implementation of a product record including a link to historic data.

FIG. 5 is a block diagram illustrating an implementation of a product record including a link to historic data. The product record 220 can be part of the product structure (T2) module 430. The product record 220 is shown as a tree structure including a plurality of objects 230. The product record also includes a link to a historic structure 510. The historic structure can be the product structure (T1) stored in location 410. A user interface of the product record 220 can include the tree structure with a branch to historic structure 510 at every object 230 which has a corresponding historic object 530.

As shown in FIG. 5, historic product record 520 can include historic object records 530 associated with the historic product record 520. Each historic object record 530 is linked to a corresponding object record 230 in the current product record 220 which has a corresponding historic object 530.

The historic structure 510 can be different from the product structure 220. For example, the product record 220 can include changes in types of classes 230 defined or changes within class records 230, such as changes to attributes 322. Further, object records 230 in product record 220 may not correspond to historic object records 530. If an object record 230 has been added to product record 220 that was not in historic structure 510, there will not be a link from the historic structure 510 to the added object record 230. If an object record 530 that existed in the historic structure 510 has been deleted, and thus, no longer exists in the current product record 220, there will be no link from the deleted historic object record 530 to the current product record 220.

Figure 6:
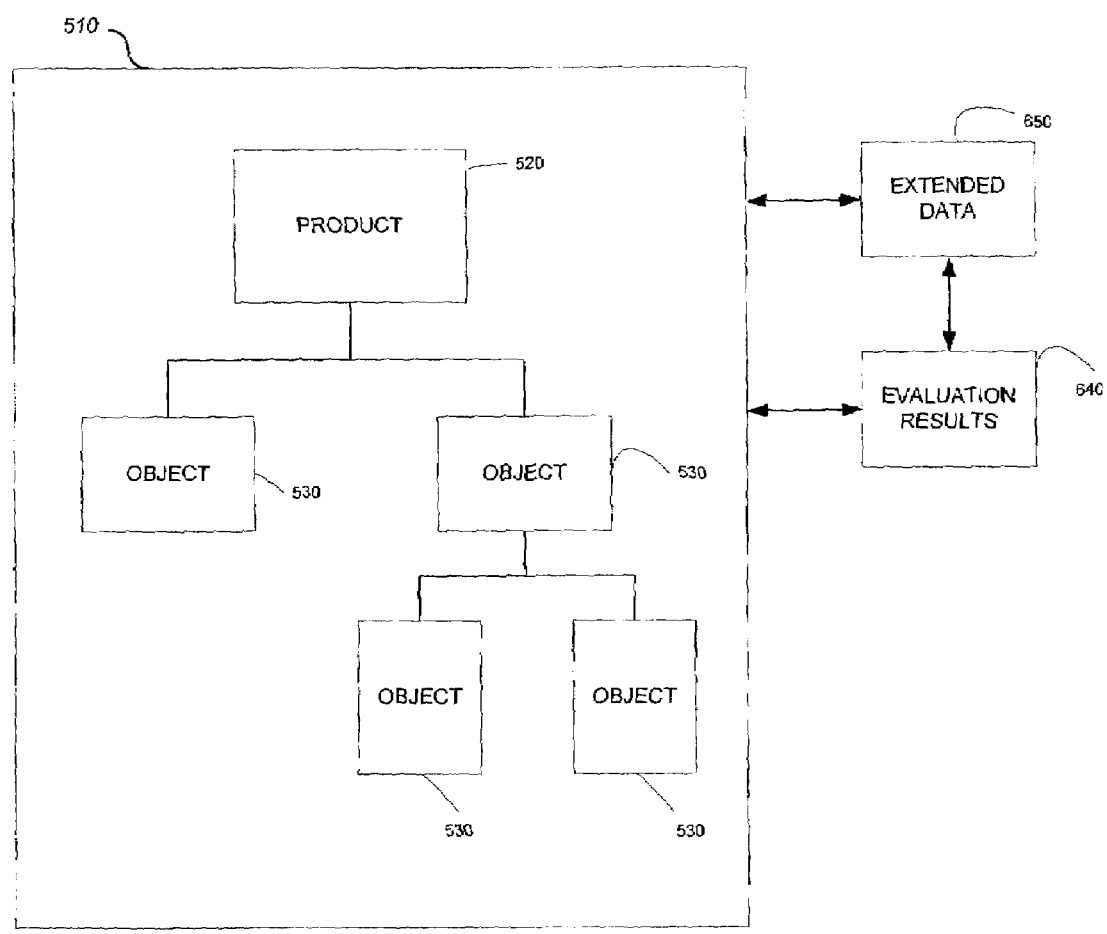
FIG. 6 is a block diagram illustrating an implementation of a historic product record.

FIG. 6 is a block diagram illustrating an implementation of a historic product record 510. As described above, the historic structure 510 can include the product structure (T1) stored in location 410.

The historic product structure 510 includes a link to extended data 650 and evaluation results 640, which includes results (T2), received from entity module 120. The evaluation results 640 can include a link to extended data 650, which can include the extended data 470 used by the entity module 120 to perform evaluations.

Figure 7:
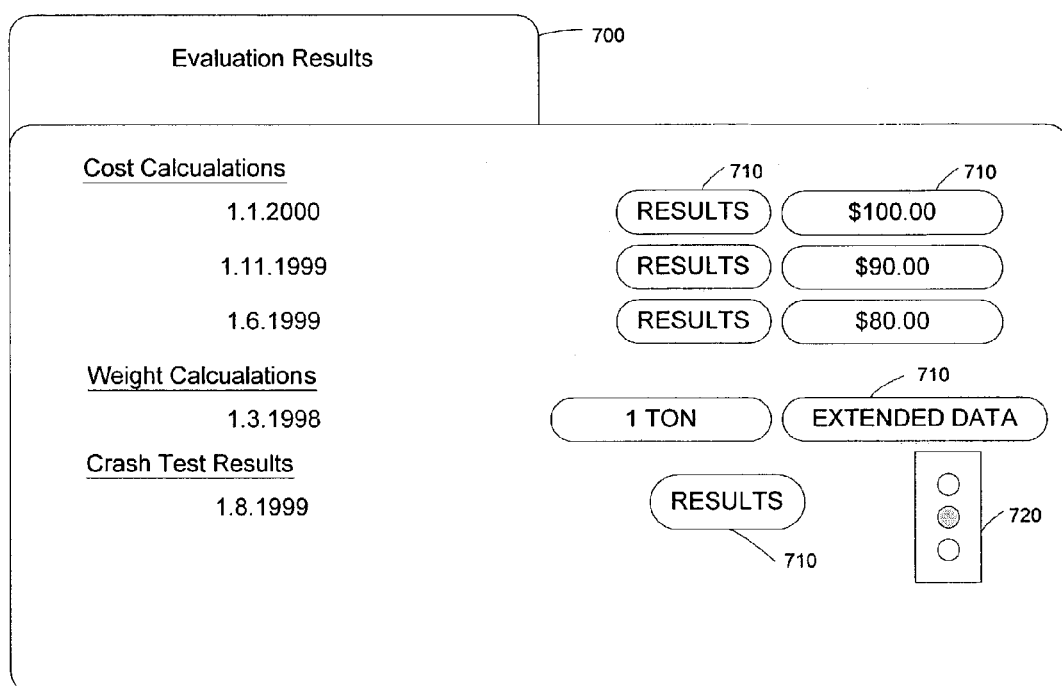
FIG. 7 is a block diagram illustrating an implementation of an external data record.

FIG. 7 is a block diagram illustrating an implementation of a user interface 700 of an external data record 640. The user interface 700 can include results from one or more entity modules 120. For example, the user interface 700 can display cost calculations performed by a cost management module, weight calculations performed by a verification module, and crash test results performed by a crash test module. Each listing of an evaluation result can include a scalar value, if a scalar value can be listed, and/or a user interface control 710 representing a link to a corresponding results record for the evaluation listed. In one implementation, the scalar value field can include the user interface control 710 to the corresponding results record for the evaluation listed.

The results can be listed by type of results, such as cost calculations, and date of results. The listing of the results can also include a user interface control representing a link to extended data used in obtaining the results.

A user can view a result record for a specific evaluation by selecting the user interface control 710 corresponding to the evaluation. Referring to FIG. 6, the result record can include the results 640 of the specific evaluation and a listing of or a user interface control representing a link to extended data 650 used to perform the evaluation.

Thus, for example, a user seeing that the cost of a part has been rising over the course of a year can select the user interface control 710 to retrieve the associated results record. The results record 710, and extended data, can include a link to the historic structure, which can indicate that some aspect of the part was substituted, increasing costs.

The user interface 700 can also include a traffic light symbol 720 or other indicator of what results corresponding to the traffic light symbol 720 suggest. For example, if the results of a crash test are negative, the traffic light 720 can include shading in the area corresponding to the red light. If the results indicate that a closer look should be given to the structure, the traffic light 720 can include shading in the area corresponding to the yellow light. If the results for the crash test were good, the traffic light 720 can include shading in the area corresponding to the green light.

Figure 8:
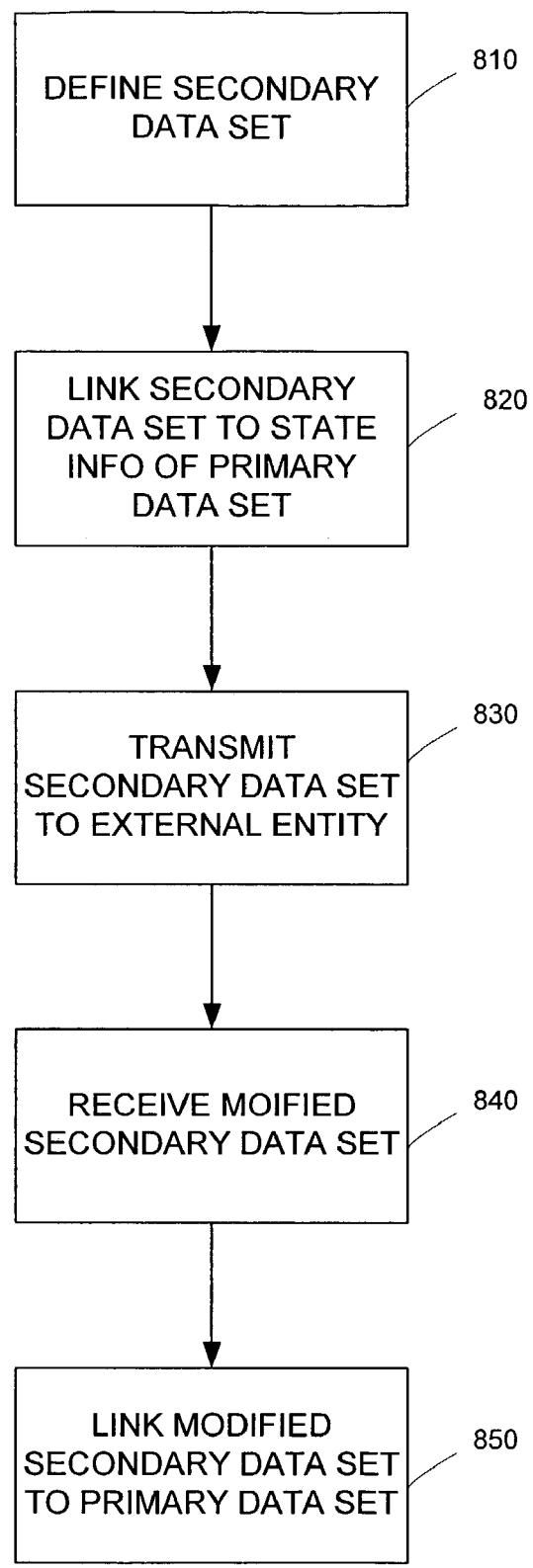
FIG. 8 is a flow diagram illustrating one implementation of a method for managing external data in a product creation system.

FIG. 8 is a flow diagram illustrating one implementation of a method for managing external data in a product creation system.

At step 810, a secondary data set is defined in the central module 110. The secondary data set can include a copy of the product structure (T1), representing a product record 220 at time T1. At step 820, the central module 110 links the secondary data set to state information of a primary data set. The primary data set can include product structure (T1). The state information can include the time, T1, the secondary data set is created and sent to an external entity.

At step 830, the central module 110 transmits the secondary data set to an external entity, such as entity module 120. The external entity can perform evaluations on the secondary data set. The evaluations can include cost calculations, verification, crash tests, or other tests that the central module would like performed based on the product structure 220.

At step 840, the central module 110 receives a modified secondary data set. The modified secondary data set can include the results of the evaluations performed at the external entity. The central module 110 can also receive extended data with the results of the evaluations. The extended data can include data used by the external entity to perform evaluations. For example, for weight calculations for a car, the extended data can include the addition of a driver and/or 5 gallons of gasoline in the fuel tank.

At step 850, the central module 110 links the modified secondary data set to the primary data set based on the state information. If the primary data set or product record 220 has been modified, the modified secondary data set is stored with a record of the primary data set corresponding to the state information. Thus, if the state information includes a reference to a product structure at a time T1, the modified secondary data set can be stored with the product structure (T1) in location 410. The link between the modified secondary data set and the primary data set allows access by a user of a modified primary data set The method can also include linking the modified primary data set, represented by the product structure (T2), to the primary data set at time T1. Thus, the product structure (T2), stored in location 430 is linked to the product structure (T1). The product structure (T1) is labeled as a historic structure 510 in the product structure (T2).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A method for managing data, comprising:
defining a secondary data set in a primary data set;
linking the secondary data set to state information of the primary data set, the state information defining a state of the primary data set at a time when the secondary data set was defined;
transmitting the secondary data set to an external entity;
receiving a modified secondary data set from the external entity, the modified secondary data set including changes to the secondary data set;
transmitting the primary data set to the external entity;
receiving results of an evaluation based on the primary data set from the external entity;

incorporating the results into the primary data set to produce a modified primary data set; and linking the modified secondary data set to a version of the primary data set stored with reference to the state information, a link between the modified secondary data set and the version of the primary data set allowing a user of the modified primary data set to access the modified secondary data set.

2. The method of claim 1, wherein linking the secondary data set to the state information includes associating the secondary data set with the primary data set at the time when the secondary data set was defined.

3. The method of claim 1, wherein linking the modified secondary data set to the version of the primary data set stored with reference to the state information includes linking the modified secondary data set to the version of the primary data set existing at the time when the secondary data set was defined.

4. The method of claim 1, further comprising linking the version of the primary data set stored with reference to the state information to the modified primary data set.

5. The method of claim 4, wherein linking the version of the primary data set stored with reference to the state information to the modified primary data set includes linking the version of the primary data set stored with reference to the state information to a later version of the primary data set, the later version of the primary data set representing a current state of the primary data set.

6. The method of claim 1, further comprising receiving and linking extended data to the modified secondary data set, the extended data including data added to the secondary data set for processes performed at the external entity.

7. The method of claim 1, wherein transmitting the secondary data set to the external entity includes transmitting the secondary data set to a verification entity.

8. The method of claim 1, wherein transmitting the secondary data set to the external entity includes transmitting the secondary data set to a cost calculating entity.

9. The method of claim 1, wherein transmitting the secondary data set to the external entity includes transmitting the secondary data set to an evaluation entity.

10. The method of claim 1, wherein transmitting the secondary data set to the external entity includes transmitting the secondary data set to a crash test entity.

11. The method of claim 1, further comprising performing processes on the secondary data set at the external entity to obtain the modified secondary data set.

12. The method of claim 11, wherein performing processes on the secondary data set includes performing evaluations using the secondary data set.

13. The method of claim 1, further comprising providing the user with a user interface to access the modified secondary data set.

14. The method of claim 13, further comprising determining if the modified secondary data set is relevant to the modified primary data set and linking the modified secondary data set to the modified primary data set if the modified secondary data set is relevant to the modified primary data set.

15. The method of claim 14, wherein determining if the modified secondary data set is relevant to the modified primary data set includes receiving input from a user indicating that the modified secondary data set is relevant to the modified primary data set.

16. A computer program product, tangibly stored on a computer-readable medium, the computer program product comprising instructions operable to cause a programmable processor to:

define a secondary data set in a primary data set;

link the secondary data set to state information of the primary data set, the state information defining a state of the primary data set at a time when the secondary data set was defined;

transmit the secondary data set to an external entity;

receive a modified secondary data set from the external entity, the modified secondary data set including changes to the secondary data set;

transmit the primary data set to the external entity;

receive results of an evaluation based on the primary data set from the external entity;

incorporate the results into the primary data set to produce a modified primary data set; and link the modified secondary data set to a version of the primary data set stored with reference to the state information, a link between the modified secondary data set and the version of the primary data set allowing a user of the modified primary data set to access the modified secondary data set.

17. The computer program product of claim 16, wherein the instructions operable to cause a programmable processor to link the secondary data set to the state information include instructions operable to cause a programmable processor to associate the secondary data set with the primary data set at the time when the secondary data set was defined.

18. The computer program product of claim 16, wherein the instructions operable to cause a programmable processor to link the modified secondary data set to the version of the primary data set stored with reference to the state information include instructions operable to cause a programmable processor to link the modified secondary data set to the version of the primary data set existing at the time when the secondary data set was defined.

19. The computer program product of claim 16, further comprising instructions operable to cause a programmable processor to link the version of the primary data set stored with reference to the state information to the modified primary data set.

20. The computer program product of claim 19, wherein the instructions operable to cause a programmable processor to link the version of the primary data set stored with reference to the state information to the modified primary data set include instructions operable to cause a programmable processor to link the version of the primary data set stored with reference to the state information to a later version of the primary data set, the later version of the primary data set representing a current state of the primary data set.

21. The computer program product of claim 16, further comprising instructions operable to cause a programmable processor to receive and link extended data to the modified secondary data set, the extended data including data added to the secondary data set for processes performed at the external entity.

22. The computer program product of claim 16, wherein the instructions operable to cause a programmable processor to transmit the secondary data set to the external entity include instructions operable to cause a programmable processor to transmit the secondary data set to a verification entity.

23. The computer program product of claim 16, wherein the instructions operable to cause a programmable processor to transmit the secondary data set to the external entity include instructions operable to cause a programmable processor to transmit the secondary data set to a cost calculating entity.

24. The computer program product of claim 16, wherein the instructions operable to cause a programmable processor to transmit the secondary data set to the external entity include instructions operable to cause a programmable processor to transmit the secondary data set to an evaluation entity.

25. The computer program product of claim 16, wherein the instructions operable to cause a programmable processor to transmit the secondary data set to the external entity include instructions operable to cause a programmable processor to transmit the secondary data set to a crash test entity.

26. The computer program product of claim 16, further comprising instructions operable to cause a programmable processor to perform processes on the secondary data set at the external entity to obtain the modified secondary data set.

27. The computer program product of claim 26, wherein the instructions operable to cause a programmable processor to perform processes on the secondary data set include instructions operable to cause a programmable processor to perform evaluations using the secondary data set.

28. The computer program product of claim 16, further comprising instructions operable to cause a programmable processor to provide the user with a user interface to access the modified secondary data set.

29. The computer program product of claim 28, further comprising the instructions operable to cause a programmable processor to determine if the modified secondary data set is relevant to the modified primary data set and link the modified secondary data set to the modified primary data set if the modified secondary data set is relevant to the modified primary data set.

30. The method of claim 29, wherein the instructions operable to cause a programmable processor to determine if the modified secondary data set is relevant to the modified primary data set include instructions operable to cause a programmable processor to receive input from a user indicating that the modified secondary data set is relevant to the modified primary data set.

* * * * *